United States Patent
Varangaonkar

(10) Patent No.: US 9,240,023 B1
(45) Date of Patent: Jan. 19, 2016

(54) PRECOMPUTING PROCESSES ASSOCIATED WITH REQUESTS

(71) Applicant: Amazon Technologies, Inc., Reno, NV (US)

(72) Inventor: Ajit Ashok Varangaonkar, Kirkland, WA (US)

(73) Assignee: Amazon Technologies, Inc. (JP)

( * ) Notice: Subject to any disclaimer, the term of this patent is extended or adjusted under 35 U.S.C. 154(b) by 299 days.

(21) Appl. No.: 13/754,785

(22) Filed: Jan. 30, 2013

(51) Int. Cl.
*G06Q 30/00* (2012.01)
*G06Q 30/06* (2012.01)
*G06F 17/30* (2006.01)

(52) U.S. Cl.
CPC ........ *G06Q 30/0633* (2013.01); *G06Q 30/0635* (2013.01); *G06Q 30/0637* (2013.01); *G06F 17/3089* (2013.01); *G06Q 30/0601* (2013.01)

(58) Field of Classification Search
CPC .......... G06Q 30/0601; G06Q 30/0635; G06Q 30/0637; G06Q 30/0641; G06Q 17/3089
USPC ................ 705/26.1, 26.8, 26.81, 26.82, 27.1; 715/205
See application file for complete search history.

(56) References Cited

U.S. PATENT DOCUMENTS

| | | | |
|---|---|---|---|
| 7,113,935 B2 * | 9/2006 | Saxena ........................... | 707/748 |
| 8,108,377 B2 * | 1/2012 | Jiang et al. .................... | 707/705 |
| 8,260,938 B2 * | 9/2012 | Gupta et al. ................... | 709/228 |
| 8,732,569 B2 * | 5/2014 | Burkard et al. ............... | 715/206 |
| 8,812,658 B1 * | 8/2014 | Teeraparpwong et al. ... | 709/224 |
| 2002/0103778 A1 * | 8/2002 | Saxena ............................. | 707/1 |
| 2010/0191856 A1 * | 7/2010 | Gupta et al. ................... | 709/228 |
| 2011/0145287 A1 * | 6/2011 | Jiang et al. .................... | 707/780 |
| 2011/0145321 A1 * | 6/2011 | Jiang ............................. | 709/203 |
| 2012/0191463 A1 * | 7/2012 | Crim ............................. | 705/1.1 |
| 2012/0284597 A1 * | 11/2012 | Burkard et al. ............... | 715/205 |
| 2013/0339327 A1 * | 12/2013 | Belmar et al. ................. | 707/703 |

OTHER PUBLICATIONS

Dimopoulos et al., "Dynamic Priority Approach to Reducing Delay in Interactive TCP Connections," Telecommunication Systems, vol. 34, pp. 59-70, Feb. 2007.*
Wasik, C., "Managing Cache Consistency to Scale Dynamic Web Systems," M.S. Thesis, University of Waterloo, Waterloo, Ontario, Canada, 2007.*

* cited by examiner

*Primary Examiner* — Nicholas D Rosen
(74) *Attorney, Agent, or Firm* — Thorpe North & Western LLP

(57) ABSTRACT

Processes from a set of processes for use at a second triggering event may be processed by performing a subset of the set of processes in response to a first triggering event to obtain a first result. A remainder of the set of processes may be processed in response to the second triggering event occurring after the first triggering event, and using the first result, to obtain a second result.

16 Claims, 10 Drawing Sheets

PRECOMPUTING PROCESSES ASSOCIATED WITH REQUESTS

BACKGROUND

Computing devices and communication networks may be utilized to exchange information. A computing device may request content from another computing device via a communication network. For example, a user at a personal computing device may utilize a browser application to request a network page from a server computing device via the Internet. In such cases, the user computing device may be referred to as a client computing device and the device providing desired information may be called a server computing device.

From the perspective of a user utilizing a client device, a user experience may be described at least partially in terms of the performance and latencies associated with obtaining network content over a communication network, such as obtaining a network page, processing embedded resource identifiers, generating requests to obtain embedded resources, and rendering content on the client computing device. Latencies and performance limitations of the above processes may diminish the user experience. Additionally, latencies and inefficiencies may be particularly apparent on computing devices with limited resources, limited processing power, limited memory, or limited network connectivity (e.g., netbooks, tablets, smart phones, and the like).

DETAILED DESCRIPTION

A technology is provided for precomputing processes associated with requests. For example, a request may be a purchase related request initiated by a user for electronically purchasing a product. Performing the request may involve an API (application programming interface) which may call processes to complete the request. At least one process selected from a larger set of processes for use at a second triggering event may be applied in response to a first triggering event to obtain a first result. The remainder of the processes may be executed in response to the second triggering event (occurring after the first triggering event) using the first result, in order to obtain a second result. In other words, an API may include multiple related processes which are divided by time of performance as a result of triggering events (e.g., such as user interactions with a page, page load requests, purchase requests and so forth). The API, or one or more processes called by the API, may effectively be paused for a period of time, where a state of the API or process is saved, and may be subsequently resumed from the saved state.

For example, the technology may be used in by an electronic retailer to reduce latencies in completing order processes when a user may purchase a product. A subset of the set of processes may be executed in response to a request for product page (as an example of the first triggering event described above), where a remainder of processes outside of the subset may be unperformed. A save state for the subset of processes may be saved as a first result. The subset of processes may be at least partially performed before the user attempts to purchase the product and may be used in completing a purchase process. The save state, or first result, may be used in performing the remainder of the processes when a purchase page may be requested for the product. For example, a state including a result of a process may be saved when a process is partially completed or fully completed, which may be used for subsequent processes depending upon the result. Because the subset of processes may be at least partially completed before the purchase page is requested, latency experienced by the user in waiting for the purchase processes to be completed may be reduced.

Figure 1A:
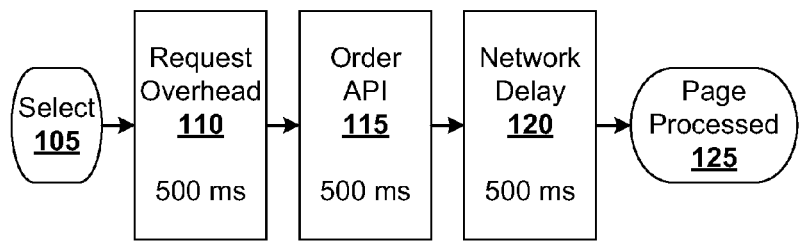
FIGS. 1a-1c are block diagrams of a purchase processing accordance with an example of the present technology.
Figure 1B:
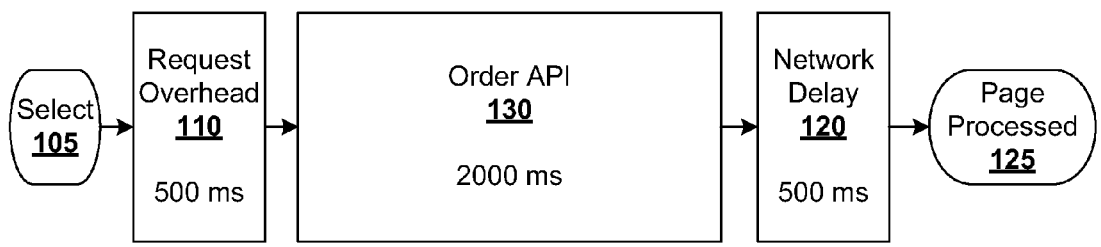
Figure 1C:
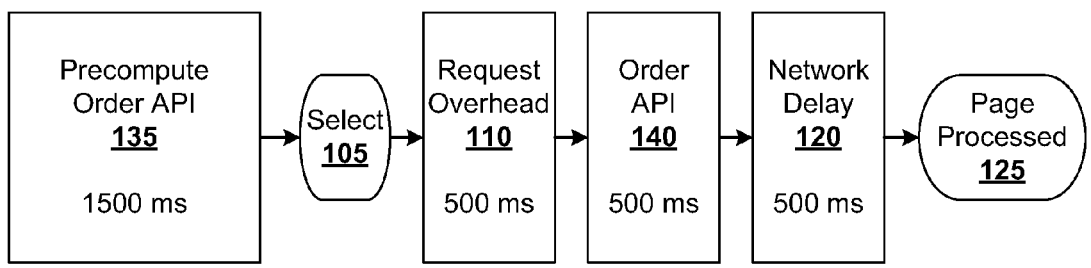

Referring to FIGS. 1a-1c, flowcharts of a purchase process are illustrated in accordance with examples of the present technology. FIGS. 1a-1c may represent a flow of order processes. For example, referring to FIG. 1a, the select 105 and page processed 125 events may represent an occurrence of an event at a point in time, such as an event when a user selects or activates a link to initiate a purchase and an event when the purchase is completed, respectively. The request overhead process 110, order API (Application Programming Interface) process 115, and Network Delay 120 block width illustrated may represent a duration of time expended in or as a result of an overhead request, an order API completion and/or a network delay.

Certain aspects of time costs incurred may be unavoidable or may not be controlled by a server processing the order. For example, network delay 120 may be a result of equipment between the server and a client (e.g., user device). While overhead requests 110 may be minimized to a certain extent, some aspects of overhead may be challenging to avoid. For example, when a client sends an HTTP (Hyper Text Transfer Protocol) request, the client may send associated cookies that have been set for a particular domain and path along with the request. Many users have asymmetric Internet connections where upload bandwidth is many times smaller than download bandwidth. A 500-byte HTTP header request may take an equivalent time to upload as 10 KB (kilobytes) of HTTP response data may take to download, and this disparity may be further exacerbated because HTTP request headers are sent uncompressed. In other words, even with requests for small objects (less than 10 KB, for example), the data sent (e.g., in a request header) may account for a large portion of a response time.

A server hosting the order processes may thus be limited in the extent to which latency resulting from overhead requests 110 or network delays 120 may be reduced. An order API 130, as illustrated in FIG. 1b, may be largely performed locally at the server. As a result, the order API 130 latency may be desired to be addressed by a system administrator desiring to reduce overall latency. FIG. 1a may represent a target latency desired by the system administrator for a positive user experience, while FIG. 1b may represent an actual latency experienced by users after a purchase is made, where the order API box 130 in particular is larger in FIG. 1b as compared with FIG. 1a, representing a greater latency for completion. Despite improved efficiencies in performing order API processes, some limitations may still exist which may limit how much time may be trimmed from completing the order API.

According to the present technology, and as illustrated in FIG. 1c, a portion 135 of the order API may be precomputed or prefetched before the select event 105 in order to reduce latency for completing the processing of the order API 140 after the click event. With this configuration, order API latencies may be reduced even while a total processing time for performing the processes included in the order API may not necessarily be reduced. The configuration of FIG. 1c enables order processing with a target latency experienced by the user that corresponds to what is illustrated in FIG. 1a but with the full order processing or order API processing 130 capability illustrated in FIG. 1b.

With an example latency goal in FIG. 1a of returning a requested page within 1.5 seconds of initiation of the request, various factors may be considered. For example, to achieve such a goal, the request and processing may be broken down into parts, each consuming a portion of the 1.5 seconds. After a customer selects a link or otherwise activates a user interface to make a purchase request, the request may include a request for overhead 110, which may consume approximately 500 ms (milliseconds). An ordering API 115 for processing the purchase request may consume an additional 500 ms and network communications may consume the remaining 500 ms before the requested page is rendered on a client device.

In many scenarios, however, while the request for overhead and network communications may respectively consume 500 ms, the ordering API may consume more time, such as approximately 2000 ms of time, as in FIG. 1b. Assuming no changes are made to the ordering API, prefetching of data may be used to achieve the 1.5 seconds latency goal, as in FIG. 1c. For example, if the page request may be accurately predicted at least 1.5 seconds (i.e., 1500 ms) in advance of a user actually initiating the page request, that 1.5 seconds before the user starts the page request may be used to pre-compute or prefetch the requested data or page such that the remaining time before the next page is displayed may include 500 ms for the overhead request, 500 ms for network communications and 500 ms for finalizing the precomputed order before the page is rendered. To an end user, the latency for the operation is 1.5 seconds, even though an additional 1.5 seconds of time (for a total of 3 seconds) was expended in precomputing the operation.

The present technology may be implemented to feasibly predict network resource requests and page requests (e.g., purchase requests) at least 1.5 seconds ahead of time with a satisfactory degree of accuracy and without significantly increasing a total cost of ownership (TCO) for executing the prediction and prefetching.

As used herein, an "API" may refer to a software-to-software interface which may enable applications or processes to communicate with one another. For example, when purchasing a product from an electronic retailer, an API may be used to obtain credit card information and to send the credit card information to a remote application that verifies whether the credit card information is correct. Once payment is confirmed, the remote application may send a response back to the electronic retailer indicating the credit card has been approved. In this example, the user may see a single interface, but multiple applications or processes may be working together using one or more APIs. An API may call one or more processes for completing a task, such as approving a credit card, for example.

With the present prefetch technology, an API may be implemented to allow saving an internal state of a process or the API multiple times and to allow the process to reuse the state at a later time. A process or API may be able to attain a high cache hit rate even for partially completed results. In existing prefetching and caching, users may get a cache hit when the prefetch request has finished and results are stored in a cache, which may result in a degraded cache hit rate if prefetch and finalize requests are made with short time delays between the two operations.

A process or API according to the present technology may bypass code paths that have already been run or processed. As a result, the API may appear to be paused after completing selected code paths before continuing again later and then bypassing the completed code paths that were completed earlier. This approach may enable significant user latency reductions because one or more parts of the process or API may be pre-executed even when there is minor time delay between a prefetch call and an actual final call. In some example applications, use of the technology has enabled significant improvement in customer facing latency, even when the server side API becomes a bit slower.

API requests, such as for single request purchasing of products, for example, may be described as being initiated in response to "selection" or "activation", any type of user interaction indicating a desire to complete the API may be received. For example, clicks, taps, gestures, eye movements, voice commands and so forth may be input from a user using any suitable type of input device, such as a mouse, keyboard, touch sensitive surface, camera, microphone and so forth in order to indicate the desire to complete the API.

Figure 2:
FIG. 2 is an illustration of a product page for purchasing a product using precomputing of processes for completing the purchase in accordance with an example of the present technology.

Referring to FIG. 2, an example page 205 for purchasing a product 210, such as a shoe, is illustrated in accordance with an example of the present technology. In this example, a "buy now" button 215 is provided to enable a single action purchase request (such as a single-click purchase) for the displayed product 210 without further interaction from the user to complete the purchase. The user may, for example, select an item or product link in a list of search results or navigate among product types, categories and so forth to arrive at the displayed page. When the page 205 is requested or at a time after the page 205 is requested and before the "buy now" button 215 is selected, a server may begin to prefetch portions of an order API to be completed when the "buy now" button 215 is selected. For example, performance or execution of portions of the order API and related processes may begin when the page 205 begins loading or after the page 205 has completed loading. Alternatively, the execution of portions of the API and related processes may take place when the user has taken specific actions with respect to the page that indicate a purchase is likely (e.g., specific pointer device movements, etc.) A state of the executed portions of the order API may be saved at the server until a "buy now" selection event is received from a client device. The executed portions of the API may include the precomputation and pre-retrieval of data in preparation for the "buy now" button to be selected.

In one example, an order API may include a set of processes, such as load, set, derive, validate and finalize processes. The load process may include, for example, operations for loading domain data or product related data used in completing the order such as coupons or promotional data and so forth. The set process may include, for example, operations for setting user information for completing the order, such as shipping address, shipping method, user name and so forth. The derive process may derive the availability of inventory of the product to be purchased. The validate process may validate or check the validity of data determined in the previously described processes, such as domain data, promotional data, user data, inventory availability and so forth. The finalize process may assign the product to the order, authorize the payment method (such as a credit card, for example) and otherwise finalize the order.

Some of the processes included in the order API may be performed at any time before the "buy now" event is received. For example, results from the load and set processes may be less likely to change than results from some of the other processes, meaning results from the load and set processes may be precomputed further in advance of the "buy now" event than other processes. Some processes, such as the derive or validate processes may be amenable to precomputation, but may be subject to other constraints, such as time constraints. For example, where an electronic retail page receives a large volume of traffic, inventory may have a somewhat rapid turnover rate. For example, if the availability of a product may be reasonably ascertained for a short, predetermined time period, such as within a range of five second up to a minute, for example, in advance of the "buy now" event, prefetching the derive or validate processes further in advance of the "buy now" event than predetermined time period may result in instances where the result of these processes is not valid when the order is to be completed and may be recomputed. One or more processes, such as the finalize process, may be limited to execution after receipt of the "buy now" event because the finalize process may result in receiving payment from the user and initiating product delivery to the user.

As has been described, one or more processes for an API may be completed or partially completed and the result or partial result may be stored for use in subsequently completing the API. Storing the result or state of the processes may be performed any number of times during execution of the processes or API and at any of a variety of intervals before or after the "buy now" event is received. For example, some processes may begin when the page begins to load. Some processes may begin when a determination is made that the user is likely to request to complete the API. Some processes may begin after the "buy now" event or complete API event is received, such as by clicking or otherwise selecting the "buy now" button to complete a purchase, and these processes return a result based on the stored state from the precomputed processes.

Some data for completing processes, such as for computing a desired shipping method, shipping address or other order related data, may be automatically determined according to server settings, settings associated with the product to be purchased, user preferences, user purchase history and so forth. However, some data may be unknown or a reliability of data to be used may be less than a predetermined threshold, such as if the user has not yet established a purchase history from which such data may be determined. In such examples, the page may prompt the user to input the data on the product page to facilitate a single click or single selection order API.

In FIG. 2, an interface 225 enabling the user to select a shipping method may be displayed on the product page 205. A load process may begin when the page 205 is loaded or is loading in this example, while the set process may begin after the user has identified the desired shipping method. In another example, the set process may also begin when the page 205 is loaded or loading when a shipping method is predicted, but may be re-executed if the user changes the shipping method via the interface 225 before completing the order. Where some input from the user is requested in order to complete the purchase, such as a shipping method, product size 220 and so forth, the derive and validate processes may not be triggered even when the server predicts that the user is highly likely to select the "buy now" button if the requested input has not been received or at least predicted. However, if the requested input has been received and the server predicts that the user is likely to select the "buy now" button 215, then the derive and validate processes may be prefetched.

Prefetching information for pages using processes from specialized APIs may be based on any of a variety of factors, such as duration of view time of a current page, tracking of mouse movements, tracking of eye movements and so forth. A network page (e.g., a web page) may include one or more links (i.e., hyperlinks) to linked pages (e.g., sub-web pages, order completion pages and so forth). Loading the information for linked pages across a network commonly involves network transfer and processing of the network page data. Prefetching information for the linked pages may reduce the latency for a user who selects a linked page for viewing. Interpreting which user interactions with the network page are more likely to result in requests for specific linked pages may be useful in optimizing prefetches before a user request is actually made. Monitoring user interactions and experimenting with variations on predictions of which user interactions with a prefetch area are more likely to result in a request for a page or other network resource may assist in optimizing prefetches and/or prefetch areas for reduced latency.

Some example prefetching criteria for prefetching a page may be based on any of a number of different factors. Some non-limiting example prefetch factors may include: timing of user interaction, actions resulting in a user viewing a current network page, user interactions with the network page, pixels or other display units or display areas used as identifiers or boundaries for prefetching and so forth.

In one configuration, embedded or linked resources associated with the network resource may be prioritized such that the retrieval and processing of the prioritized embedded resource(s) occurs in response to a determination that the network resource(s) are more likely to be requested. For example, a user of a client device may initiate movement of a cursor toward a link on a page. In response, retrieval of one or more prioritized resources associated with the linked page may be initiated in anticipation of user activation of the link (e.g., "clicking" on the link using a cursor). In the context of the order processing examples used herein, initiation of movement of a cursor toward a "buy now" link for completing an order API may result in execution or at least partial execution of one or more processes in the order API before the "buy now" link is selected by the user.

Movement of the cursor may be monitored or tracked. Aspects of movement of the cursor or cursor function may be monitored, such as a hold time of a cursor remaining in a same position or within a defined area relative to the page. In addition, the time elapsed between cursor movement from one position relative to the page to another position of the cursor relative to the page may be tracked. A variety of different types of data may be collected and processed for optimizing prefetches.

A probability that a linked page may be requested may be identified based on the user interaction detected or tracked. The probability may be used in determining whether to prefetch a linked page or portions of a linked page for subsequent user interactions using the processes described earlier. For example, a record of specific user interactions and requests for linked pages may be retained. The record may be analyzed to determine a probability or likelihood that specific user interactions resulted in the requests for linked pages. A threshold probability above which user interactions similar to recorded user interactions may be classified as probable for resulting in a request for a linked page may be identified. For example, a hold time of the cursor relative to a link to the linked page of greater than 4 seconds and within 200 pixels of the link may have a probability of greater than 50% that the linked page may be requested, and may result in a "probable" classification.

A network resource (e.g., an API or a portion of an API, a web page, a video file, an audio file or the like) may be prefetched when the a request for the network resource is determined to be probable. For example, when the probability is greater than a predetermined threshold value (e.g., 30%, 50%, 75%, 90% and so forth) then the request for the network page, video, audio or other network information may be made.

Experimental results suggest that a greater use of prefetching for a page may result in encountering a number of scaling issues and involvement of a high computing cost (e.g., in terms of processor time and power) than an optimized use of prefetching as described below. While setting short intervals of time preceding the request (e.g., performing prefetch processes at one or two seconds before a page request) may increase accuracy of prefetch predictions, short intervals may also result in increased latency because insufficient time is available to precompute the operation. Longer intervals (e.g., prefetches performed at three or four seconds before a page request) may result in less accurate prefetches but may also provide reduced latency because of the additional time to load a resource. A balance may be obtained for balancing computing costs, latency experienced by a user and so forth based on a desired accuracy of prefetching for a given time interval and a desire to complete a certain amount of processing before the page request is received. In other words, there is a balance between prefetching the next page after every movement (to provide the best customer latency) and prefetching as little as possible (to reduce calculation overhead on the server).

Prefetched or precomputed data or operations may be cached for a predetermined period of time, as has been described. Certain operations, such as a "Buy Now" page request, if prefetched, may thus cache the inventory to reserve the product for the user for a predetermined period of time. During this period of time, the system may not re-derive availability of the product or other inventory item, either because the item is reserved or because the time period is short enough that depletion of inventory during the time period is negligible. However, a determination may be made as to whether depletion of inventory is a valid concern for prefetched order requests. Experimental data may suggest that for a given product, a small percentage of purchases of the same product may occur within a defined period of time. For example, approximately 0.04% of orders may relate to purchases of a same product within 10 seconds of another order. Thus, if the prefetched data is cached for any amount of time up to 10 seconds, a number of orders for the product exposed to a potential inventory issue may be on the order of approximately 80 to 400 orders per one million orders. Because the issue is merely a potential issue which affects a very small proportion of the total orders for a particular product, an assumption may be made that a risk of inventory issues when prefetching purchase overhead and related network pages may be minimal and negligible if the inventory is reserved or at least considered available for 10 seconds or less from the evaluation.

Although some of the examples herein describe the retrieval and processing of network resources by a network computing component, such as an intelligent proxy server, application server, data server, or other network device, the technology may also be applied to any number of other network hardware devices, software processes or applications.

While this example and others described later are described primarily in terms of network pages, the technology may be applied to any type of page or network resource which may be requested and for which reduced latency is desired. For example, a resource may include a page, a video clip, an audio clip, an image, a text document, an application page, any other suitable type or configuration of resource which may be requested or from which a request may be made.

For some example purchase processes described, such as purchase processes enabling a user to complete an entire order or purchase request with a single link selection or activation event, business logic for completing the purchase may be executed in a single API. Even with significant parallelization, the path of business logic may have significant latency. The use of the present technology in single selection requests to distribute completion of the process before and after the selection may assist in latency reduction for single selection request processing. However, the present technology may be used for multi-selection requests as well, such as order requests including multiple different APIs called when multiple different network pages are requested. The present technology may also be used in a variety of different applications or for a variety of different purposes and is not limited by the specific examples of electronic retailers, product purchases or the like.

Figure 3:
FIG. 3 is an illustration of a shipping page for selecting shipping options and precomputing order processes in accordance with an example of the present technology.

Referring to FIG. 3, an example page 305 is illustrated where order processes are divided across multiple pages and potentially across multiple APIs. For example, a user may have selected to purchase the shoe on the product page of FIG. 2, but may not have had the option to select a shipping method. In this example, the load process may have been completed on a product details page and the set process may be completed on the presently illustrated shipping page 305 via the displayed interface 310. Additional processes for completing an order may be allocated across additional pages. Prefetching of processes or portions of the process may be performed at any suitable time. For example, the load process may be performed on the product details page or may be prefetched on the shipping page while the user confirms 315 a preferred shipping method. The preferred shipping method may be prefetched at the product details page or the shipping page before a selection is received from the user. For example, if a majority of users prefer two-day shipping over a free shipping option, then the two day shipping may be precomputed for the current order. If the user changes the selection, then the shipping option may be re-computed when the user selects to confirm 315 the shipping option or the default selection may be precomputed in advance of the selection to confirm 315 the shipping option.

Figure 4A:
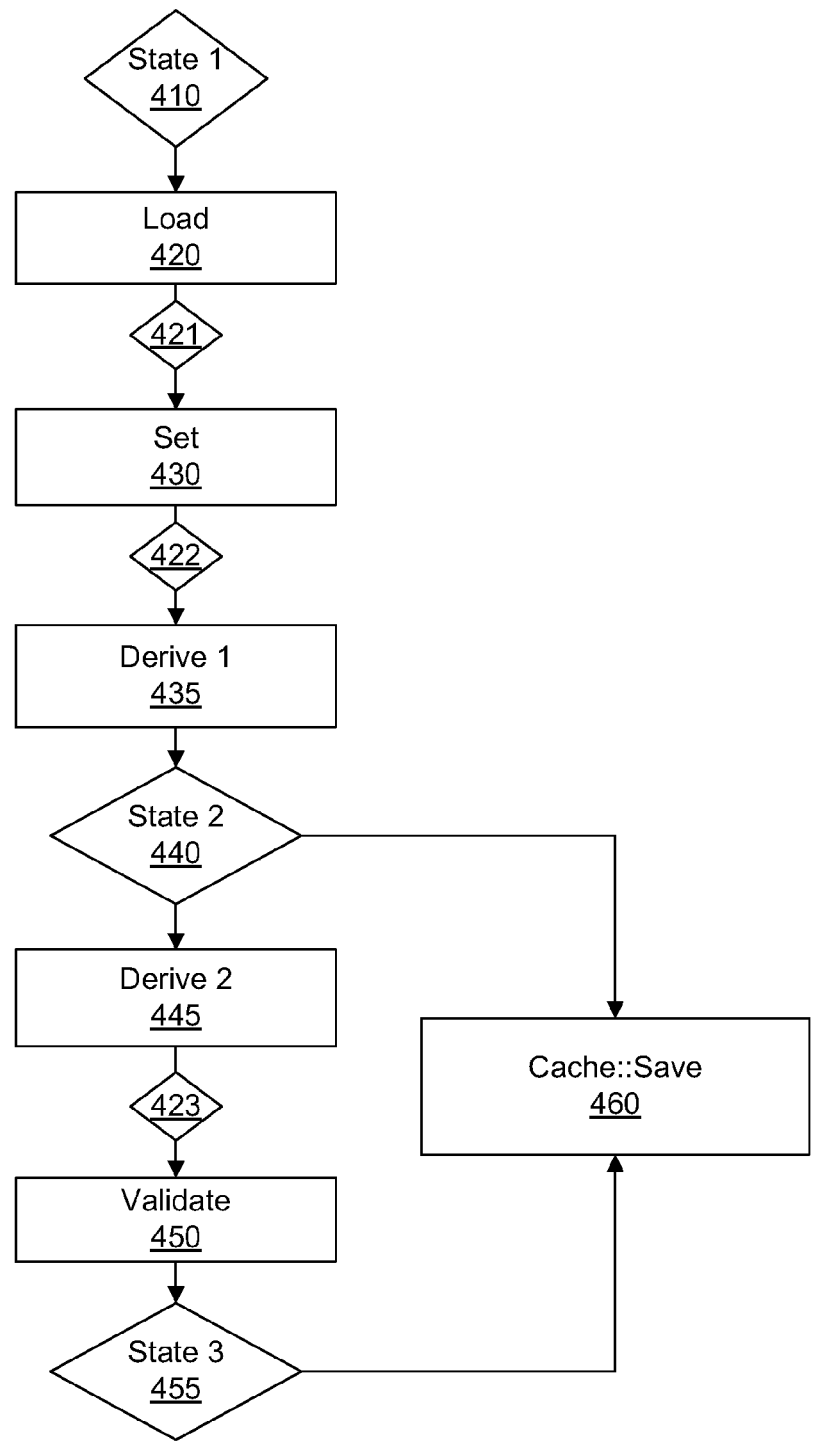
FIG. 4a is a flowchart illustrating precomputing processes in a purchase in accordance with an example of the present technology.

Referring to FIG. 4a, a block diagram of a flowchart is illustrated for precomputing portions of an API in accordance with an example of the present technology. At State 1 410, the API may be initiated. One or more Load processes 415 may be performed. Processes may be performed sequentially or in parallel. The results of these processes may be consolidated and the set 430 processes described previously may be performed, such as to set customer preferences for example. A derivation process, derive 1 435, may be performed for the inventory item to be purchased. A state or result, State 2 440, of the processes in the API performed thus far in the flow may be saved to a data store or cache 460. The cache 460 may be used to store the state of the order API, customer order information, product information, digital subscriptions, and so forth to use in completing the order API. The cache 460 may be a temporary data store for temporarily storing state data until an expiration time is reached or until an instance of the order API is completed. After State 2 440 is saved, additional delivery evaluations or derivations may be calculated in another derivation process, derive 2 445. The flow may proceed to a validate process 450 for validating the results of the load, set and derive processes. A state, State 3 455, may then be saved to the cache 460 at the conclusion of the validate process 450.

While FIG. 4a illustrates the state being saved between derive processes (i.e., State 2 440) and after the validate process (i.e., State 3 455), the state may be saved at any other or different times as well and is not limited to saving at any limited time. Some different or additional example save state locations are also illustrated at 421-423. In some examples, a decision as to locations in the flow for saving a state may be based on an expected viability of results of a process. For example, if results from some processes may be usable for a longer period of time, such as several minutes or hours, these results may be saved in a separate state or even a storage location separate from a state for processes with a result usable for a short period of time, such as several seconds.

Figure 4B:
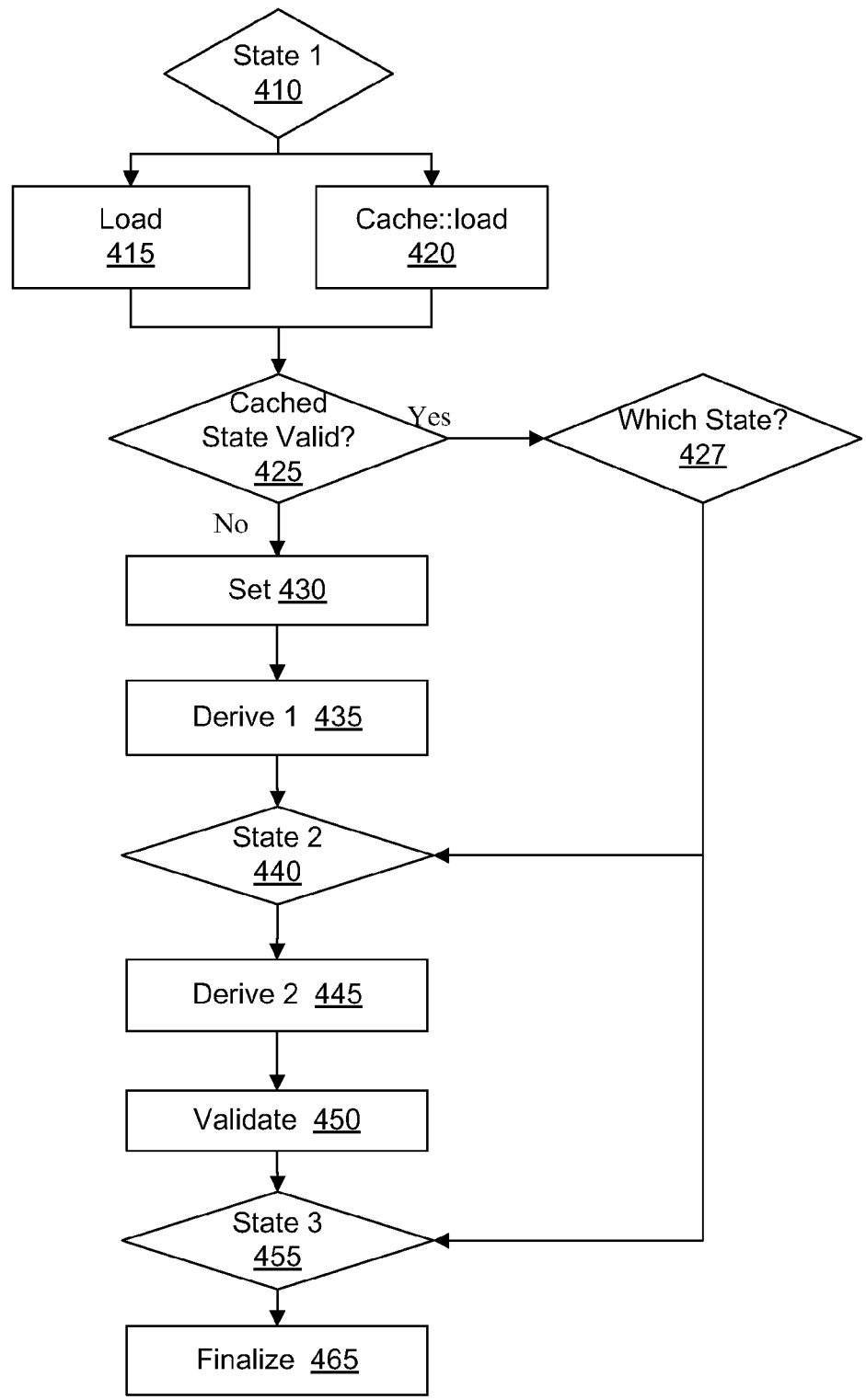
FIG. 4b is a flowchart for illustrating finalizing processes in a purchase in accordance with an example of the present technology.

FIG. 4b illustrates a flowchart for finalizing an API based on prefetching of portions of the API, as in FIG. 4a, in accordance with an example of the present technology. In FIG. 4b, one or more load processes 415 may be performed as in FIG. 4a. However, FIG. 4b also depicts a cache::load process 420 for loading a saved state as saved from the flow depicted in FIG. 4a. If a saved state is available to load, a determination 425 may be made as to whether the cached state is still valid. For example, some information upon which the saved state is predicated may have changed, rendering the saved state invalid. As another example, a maximum period of time for the saved state to remain valid may have passed, rendering the state invalid. If more than one saved state is available, the saved states may be evaluated independently to determine the validity of each of the saved states. A saved state which is valid and furthest along in the order API may be selected for finalizing the API. If no saved states are available or valid, the flow may proceed similar to the flow illustrated in FIG. 4a, with the set, derive, validate and other processes. If a saved state is available and is valid, the flow may determine 427 which state is available and valid and skip to the furthest available, valid state for finalization. For example, where State 3 455 is available and valid, the API may skip processes 430, 435, 445, 450 which were performed previously (see FIG. 4a) and may be finalized by performing the finalize process 465 based on the results in the saved state from the previously performed processes.

To develop the capability to split the API sequence at any point, variables or results of the sub-sequences may be stored independently. Results may be saved to the cache 460 in a retrievable and identifiable manner, such as by including a prefetch identification (ID) and a variable name. Loading and saving of variables or states may be performed in parallel and each payload may have a relatively small size. Different compression mechanisms may be used for different objects saved. However, this configuration may also result in multiple calls to the cache 460 per case API. As an alternative to saving the variables independently to the cache 460, the variables may be saved in a single structure to the cache 460, where a key may be a prefetch ID without variable name(s). This may allow for a single call for loading/saving variables per API per call point, but may also result in a larger payload size, which in turn may result in a larger time cost.

In one example implementation, a prefetch ID may be provided for separate pages for which prefetches are made. For example, a prefetch ID, along with a timeout, may be provided for each product page for an electronic retailer. A prefetch area may be defined around a link, such as a purchase link for purchasing a product. When a cursor moves within the prefetch area of a predefined radius (determined empirically) around the link, a determination may be made as to whether a previous prefetch has already expired and whether to make a prefetch call again.

In another example, a product or shipping page may include options to buy the product with different shipping options. If the user changes a shipping option, the prefetch ID may change and the purchase request may be made or prefetched with the new input. If the user makes the change and then goes back to the previous shipping option within the prefetch timeout, another call for the prefetch may not be made since the unexpired prefetch by that ID is already available.

When finalizing an order, the prefetch ID may be used to load saved states from the cache 460. If a prefetch ID is not available or if the prefetch ID references an expired (i.e., cache timeout) prefetch, then the flow may proceed as if no prefetches have been made.

If a user opens multiple browser tabs for a same product with same input, the prefetch ID may match across the tabs. However, the prefetch may be performed in each tab and may overwrite an existing prefetch with the prefetch ID based on the timing of the prefetch call. The last written prefetch may be associated with the prefetch ID to be used when the user selects the "buy now" link in any of the tabs, if the prefetch is still valid.

Figure 5:
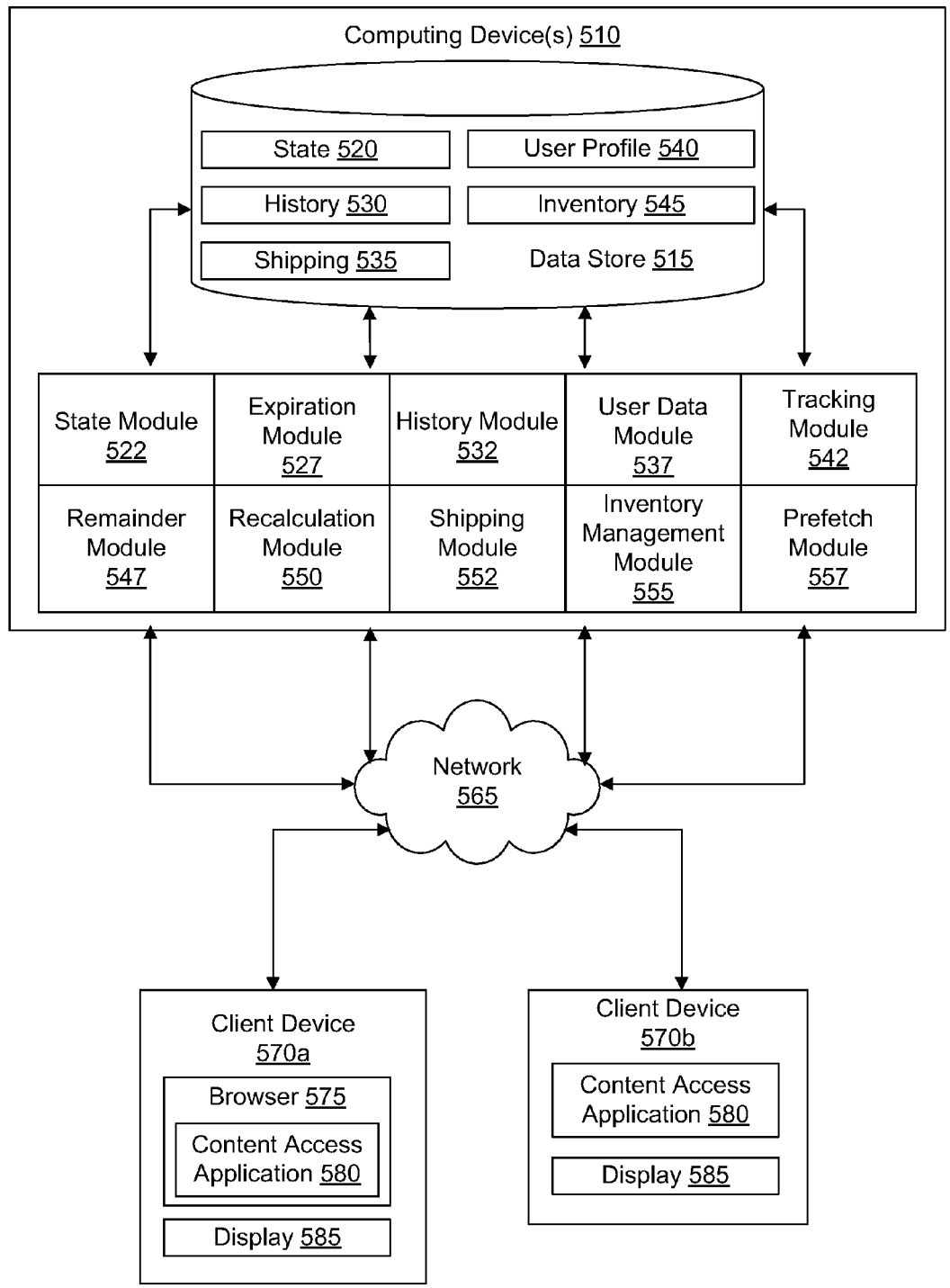
FIG. 5 is a block diagram of a system for precomputing processes associated with requests in accordance with an example of the present technology.

Referring to FIG. 5, a block diagram of a system for precomputing processes associated with requests is illustrated in accordance with an example of the present technology. The system may be implemented across one or more computing device(s) 510, 570a, 570b connected via a network 565. For example, a computing device 510 may include a data store 515 and various modules such as an a state module 522, an expiration module 527, a history module 532, a user data module 537, a tracking module 542, a remainder module 547, a recalculation module 550, a shipping module 552, an inventory management module 555 and a prefetch module 557 which may be executable by a processor of the computing device 510. The data store 515 may include multiple data stores for storing a state 520, a user history 530 (such as a purchase history, for example), shipping information 535, a user profile 540, and inventory data 545. The data store 515 may also include other data stores for storing any other suitable data, as will be apparent from the present description.

The system may be configured to process a subset of purchase processes in response to a page request received from a client device 570a, 570b. The subset of processes may begin to be executed immediately upon receipt of the page request, may begin when the page has been loaded, after the page has been loaded on the client device 570a, 570b, or after a specified user interaction with the requested page indicates that the processes are to begin. The system may include a remainder module 547 for initiating a remainder of purchase processes in response to a purchase request and based on the completed state of the subset of purchase processes. In other words, the remainder module 547 may initiate (e.g., perform or spawn) at least some of the processes not included in the subset of processes to be performed in response to the page request. The subset of processes and the remainder of the processes may be part of a single API and may be associated with, dependent on, or for use in completion of the order or completion of portions of the API to be completed after a user selects to complete the order.

The system may include the prefetch module 557 to perform intermediary purchase processes in response to a likelihood that the purchase request will be received that is greater than a predetermined threshold, based on user interaction with the page. The intermediary processes may be included with the remainder processes as being processes not performed in response to the page request. In another aspect, the subset of processes, the intermediary processes and the remainder processes may be discrete processes or (sub)sets of processes. For example, the intermediary processes may include derive and validate processes and the remainder processes may include finalize processes.

The system may include the state module 522 to store a completed state of the subset of processes when the subset of processes have been processed by the processor. The state may also be stored for intermediary processes, if desired. The completed state may be stored in the state data store 520 and may have an expiration associated therewith. The state module 522 may also be used for retrieving a saved state, such as using a prefetch ID, as has been described.

The system may include the expiration module 527 for determining an expiration to be associated with a prefetched result. For example, the expiration may be a matter of milliseconds, seconds, minutes, hours or any other suitable duration of time. The expiration module may also be used with the state module 522 for determining whether a saved state has expired. The expiration module 527 may expire a completed or saved state after a predetermined period of time. A different duration of time for expiration may be assigned for different processes, pages, products, services and so forth. In other words, the expiration time may be set specifically for individual items or groups of processes independently of other processes or groups of processes. For example, the load and set processes may have a longer expiration than the derive and validate processes. Also, the load and set processes for one page may have a different expiration than the load and set processes for a different page.

The system may include the history module 532 for analyzing a history of the user as stored in the history data store 530. For example, the history module 532 may determine addressee information, preferred shipping methods, order completion preferences and so forth from the history data store 530 for use in completing a current order. In other words, the history module 532 may access a history of a subset of purchase processes (such as the load or set processes) as a basis for performing a current instance of the subset of purchase processes.

The system may include the user data module 537 to identify user data for completion of the order. Some non-limiting examples of user data (which may be identified from the user profile data store 540 or the history data store 530) may include a purchase payment method, user preferences and so forth. In one example, the subset of purchase processes may include including processes for calculating a purchase sub-total, calculating a purchase tax, calculating a purchase total based on the sub-total and tax, and populating the purchase payment method based on the user data.

The system may include the tracking module 542 for tracking user interaction with a page. For example, the tracking module 542 may be configured to receive tracking information obtained from a browser 575 or content access application 580 on a client device 570a, 570b. The tracking module 542 may be in communication with the prefetch module 557 to cause the prefetch module 557 to cause one or more processes to be prefetched when tracked user interaction is indicative of a likelihood above a predetermined threshold that the user may request a network page/resource, such as by requesting purchase of an item.

The recalculation module 550 may recalculate the completed state after the completed state has been expired by the expiration module 527. For example, the state module 522 may attempt to retrieve a previously saved state when the tracking module 542 identifies a likelihood that a selection event will be received, based on tracked user interaction, but if the expiration module 527 identifies the saved state as invalid or expired then the recalculation module 550 may be used to recalculate or begin recalculating the expired state before the selection event is received.

The shipping module 552 may identify a shipping history of a user from the shipping data store 535. For example, the shipping data store 535 analyzed may include addressee name or address, shipping method, shipping cost, shipping time and so forth. Further, the shipping history may be analyzed to determine whether different types or categories of items, purchases, services or the like were given different shipping options. A variety of different types of shipping data may be retrieved from the shipping data store 535. Also, the shipping data store 535 may store shipping information for current inventory for comparison against the historical shipping data. The shipping module 552 may thus be enabled to identify an appropriate shipping address and a shipping method for use in calculating a shipping cost for the order.

The inventory management module 555 may be used to identify available inventory based on the inventory data store 545 and to reserve inventory for the purchase request in advance of the purchase request, such as when the user interaction with the page indicates a likelihood greater than a predetermined threshold that the purchase request will be received, as determined using the tracking module 542. Inventory may be reserved for a limited time such as 1 to 60 seconds and if the user does not purchase within that time frame, then the inventory reservation may be released.

The modules that have been described may be stored on, accessed by, accessed through, or executed by a computing device 510. The computing device 510 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device 510 is referred to herein in the singular form. Even though the computing device 510 is referred to in the singular form, however, it is understood that a plurality of computing devices may be employed in the various arrangements described above.

Various applications and/or other functionality may be executed in the computing device 510 according to various embodiments, which applications and/or functionality may be represented at least in part by the modules that have been described. Also, various data may be stored in a data store 515 that is accessible to the computing device 510. The data store 515 may be representative of a plurality of data stores as may be appreciated. The data stored in the data store 515, for example, may be associated with the operation of the various applications and/or functional entities described. The components executed on the computing device 510 may include the modules described, as well as various other applications, services, processes, systems, engines or functionality not discussed in detail herein.

The term "data store" 515 may refer to any device or combination of devices capable of storing, accessing, organizing and/or retrieving data, which may include any combination and number of data servers, relational databases, object oriented databases, simple web storage systems, cloud storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM, optical media or hard-drive type media.

The client devices 570a, 570b shown in FIG. 5 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 570a, 570b may be embodied, for example in the form of a client computer, a desktop computer, a laptop computer, a mobile device, a hand held messaging device, a set-top box, heads up display (HUD) glasses, a car navigation system, personal digital assistants, cellular telephones, smart phones, set-top boxes, network-enabled televisions, music players, web pads, tablet computer systems, game consoles, electronic book readers or other devices with like capability, including capabilities of receiving and presenting content from a server. Each client device 570a, 570b may include a respective display 585. The display 585 may comprise, for example, one or more devices such as cathode ray tubes (CRTs), liquid crystal display (LCD) screens, gas plasma based flat panel displays, LCD projectors, or other types of display devices, etc.

Each client device 570a, 570b may be configured to execute various applications such as a browser 575, a respective page or content access application 580 for an online retail store and/or other applications. The browser 575 may be executed in a client device 570a, 570b, for example, to access and render network pages, such as web pages or other network content served up by the computing device 510 and/or other servers. The content access application is executed to obtain and render for display content features from the server or computing device 510, or other services and/or local storage media.

In some embodiments, the content access application 580 may correspond to code that is executed in the browser 575 or plug-ins to the browser 575. In other embodiments, the content access application 580 may correspond to a standalone application, such as a mobile application. The client device 570a, 570b may be configured to execute applications beyond those mentioned above, such as, for example, mobile applications, email applications, instant message applications and/or other applications. Users at client devices 570a, 570b may access content features through content display devices or through content access applications 580 executed in the client devices 570a, 570b.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 6:
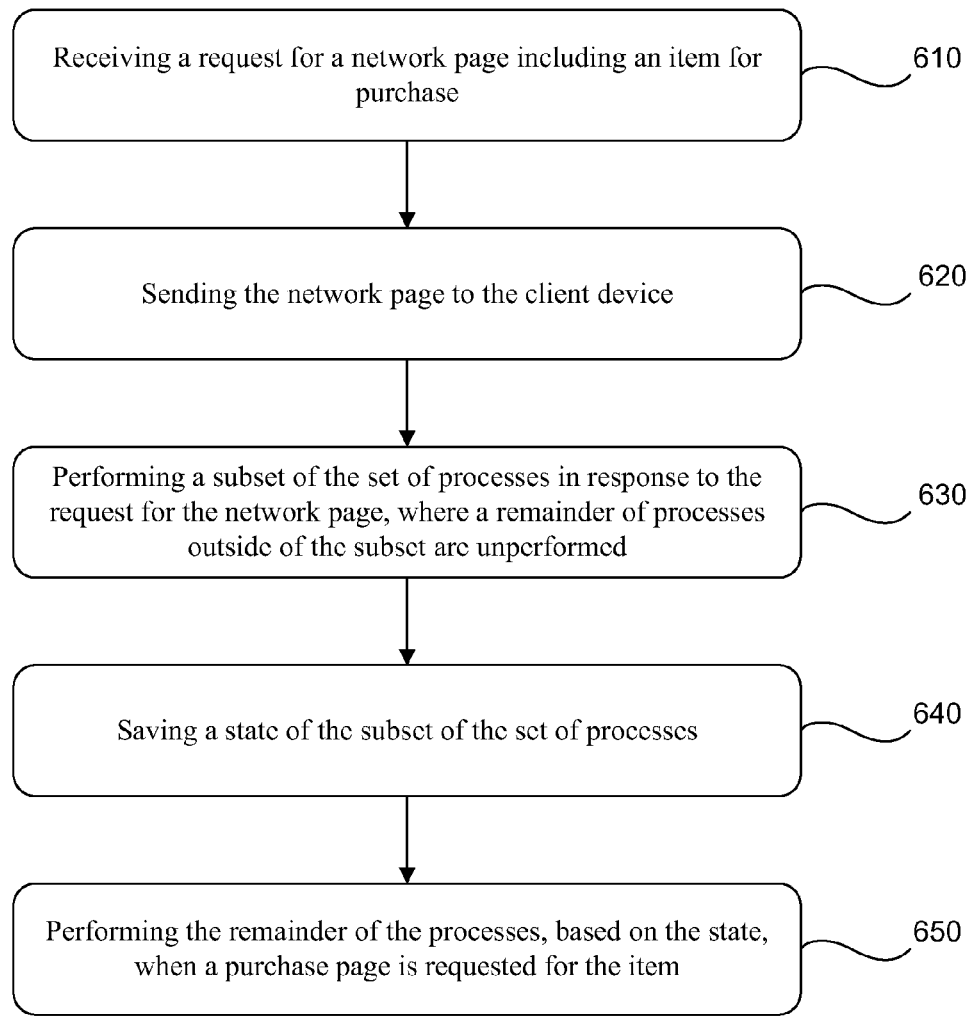
FIG. 6 is a flow diagram of a method for completing a purchase using a set of processes in accordance with an example of the present technology.

Referring now to FIG. 6, a flow diagram of a method for completing an electronic commerce purchase using a set of processes is illustrated in accordance with an example of the present technology. The method may include receiving 610 a request for a network page including an item for purchase. The request may be received at a server device from a client device and may be initiated by a user at the client device. In response, the network page may be sent 620 to the client device. A subset of the set of processes may be performed 630 immediately or with some time window in response to the request for the network page. A remainder of processes outside of the subset may remain unperformed until later. A state of the subset of the set of processes may be saved 640 for use with the remainder of processes to be performed. The remainder of the processes may be performed 650 when a purchase page is requested for the item based on the saved state of the subset of the set of processes. In other words, the saved state may be used to more quickly process the remainder of the processes.

The method may also include tracking user interaction with the item page to determine when a likelihood exists that the purchase page may be requested. When the user interaction indicates a likelihood that the purchase page may be likely to be requested, performance of the remainder of the processes may be initiated.

In a specific example, the set of processes may include processes for loading data, setting data, deriving data, validating data and finalizing data, as described earlier. The subset of these processes to be performed in response to the page request may include the loading data and setting data processes. The deriving data and validating data processes may be remainder processes and may be prefetched when tracked user interaction indicates a likelihood that the purchase page may be requested. The finalizing data process may be another remainder process, but may be performed after the purchase page has been requested.

Figure 7:
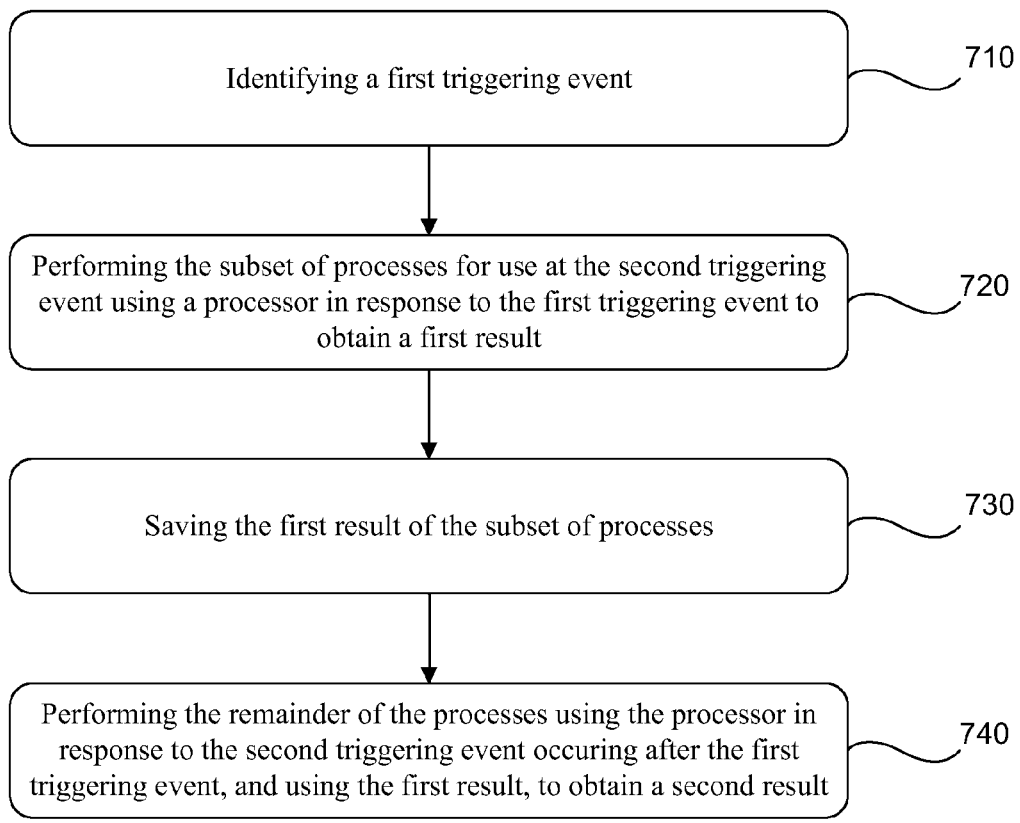
FIG. 7 is a flow diagram of a method for computing processes from a set of processes for use at a second triggering event in accordance with an example of the present technology.

Referring to FIG. 7, a flow diagram of a method is illustrated for computing processes from a set of processes for use at a second triggering event. As stated previously, the present technology may be applied to applications outside of order processes or outside of electronic retail contexts. The present technology enables processes associated with or for use at the second triggering event to be performed both before and after the second triggering event. The processes may be multi-part data access related processes and may include time-restricted and non-time-restricted processes. The processes may be part of a single API that may be called or invoked by an application any number of times before the API is completed. In other words, a same API may be invoked multiple times and return a response every time while storing the state in a data store for use during a subsequent invocation of the API. The set of processes may divided into a subset of processes and a remainder of processes, where each of the subset group and the remainder group include at least one process, the remainder group including at least one process in the set of processes but outside of the subset of processes.

The method may include identifying 710 a first triggering event. For example, the triggering event may be a page request, page load completion, detected user interaction, or any other suitable triggering event. The subset of processes configured to prepare data for use at the second triggering event may be performed 720 in response to the first triggering event to obtain a first result, and the first result may be saved 730 for later use. The remainder of the processes may be subsequently performed 740 in response to the second triggering event using the first result to obtain a second result. The second triggering event may occur after the first triggering event.

In one example, the first triggering event may be a page request and the second triggering may also be a page request for a different page than the page request for the first triggering event. For example, the first triggering event may be a request for a product page and the second triggering event may be a request from the product page for a purchase completion page.

In another example, the first triggering event may be a page request and the second triggering event may be a likelihood above a predetermined threshold that a second page will be requested. For example, user interaction with the page loaded in response to the first triggering event may be tracked to determine whether a second page will be requested.

In another example, the first triggering event may be a likelihood above a predetermined threshold that a page will be requested and the second triggering event may be a request for the page. In this example, user interaction with the current page may be the first triggering event and one or more processes in the set of processes which are performed upon receipt of a page request or upon loading of a page may instead be performed later according to tracked user interaction with the page.

The remainder of processes may include intermediary and final processes, respectively including at least one intermediary and final process. The method may further include receiving a third triggering event after the second triggering event. To put this example in context with the example above, the third triggering event may be a user input received event or receipt of a purchase request from a user. The second triggering event may be user interaction indicative of a likelihood that the third triggering event will occur. In a more specific example, the second triggering event may be time a selection cursor is located over an item price on the item page or a movement of the selection cursor toward a specific user interface control. The first triggering event may be loading of a network page or receiving a first page request. The intermediary processes may be performed between the second and third triggering events, and the final processes may be performed after the third triggering event.

In some examples, tracked user interaction with a page may not give sufficient notice that the third event is to occur. In this example, the intermediary processes may be partially performed between the second and third triggering events, and performance of the intermediary processes may be finished after the third triggering event. Also, the final processes may be performed after the third triggering event.

In some examples additional saved states may be used as compared with some of the previous examples, such as in FIGS. 4*a*-4*b* where a state is saved multiple times, even for similar or the same processes, such as the "derive" processes. In the present example, the first result may be a saved state which is saved when load and set processes are completed after the page request is received. The second result may be a saved state after the second event, such as user interaction. Where the remainder processes include the intermediary and final processes, the method may further include receiving a third triggering event after the second triggering event, performing the intermediary processes between the second and third triggering events to obtain a third result, and saving the third result in preparation for receipt of the third triggering event. The third result may be another saved state after further processing after the second event but before the third event, which may be a selection or user interaction to complete a purchase request. Finalization of the order after the selection of the purchase request is received may produce a fourth result.

The method may include assigning an expiration time to the first and/or second results. When an expiration time is assigned to both the first and second results, the expiration time may be different for the first and second results. If the first or second results have expired or if a time between the first and second triggering events is greater than a threshold time, the subset of processes may be re-performed.

In one aspect, the method may include identifying a history of the subset of processes and performing the subset of processes based on the history.

Figure 8:
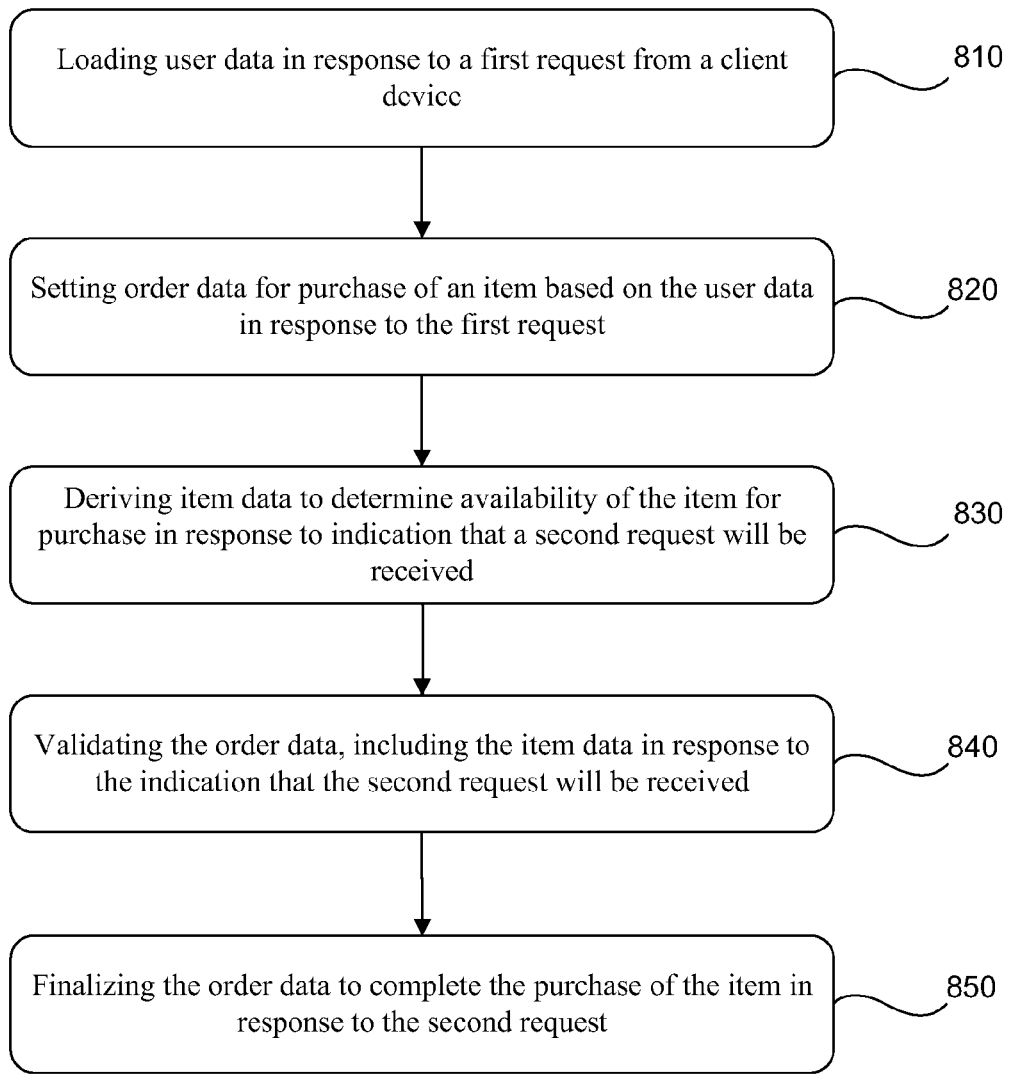
FIG. 8 is a flow diagram of a method for completing a purchase of an item in accordance with an example of the present technology.

Referring to FIG. 8, a flow diagram of a method is illustrated in accordance with another example of the present technology. The method may include loading 810 user data in response to a first request from a client device. Order data for purchase of an item may be set 820 based on the user data in response to the first request. Item data may be derived 830 to determine availability of the item for purchase in response to indication that a second request may be received. The order data, including the item data, may be validated 840 in response to the indication that the second request may be received. The order data may be finalized 850 to complete the purchase of the item in response to the second request.

The systems and methods of the present technology enable pre-execution of at least portions of an API in multiple phases, where the API may be "paused" at any time by saving the state. The state may be reused at a future point to "continue" execution of the API. In other words, a same API may be called multiple times before the API is completed and may have a state saved any number of times when the API is called. The technology enables precomputation of computationally expensive portions of an API when the user is not waiting in order to reduce user-facing latency. Some example implementations have resulted in as much as 75% reduction in user-facing latency over configurations not implementing the present technology. Some illustrated example implementations of the present technology have been for reducing single page checkout page latency (see FIG. 2) or for providing a ship option selection page for improving a pay page latency (see FIG. 3).

Figure 9:
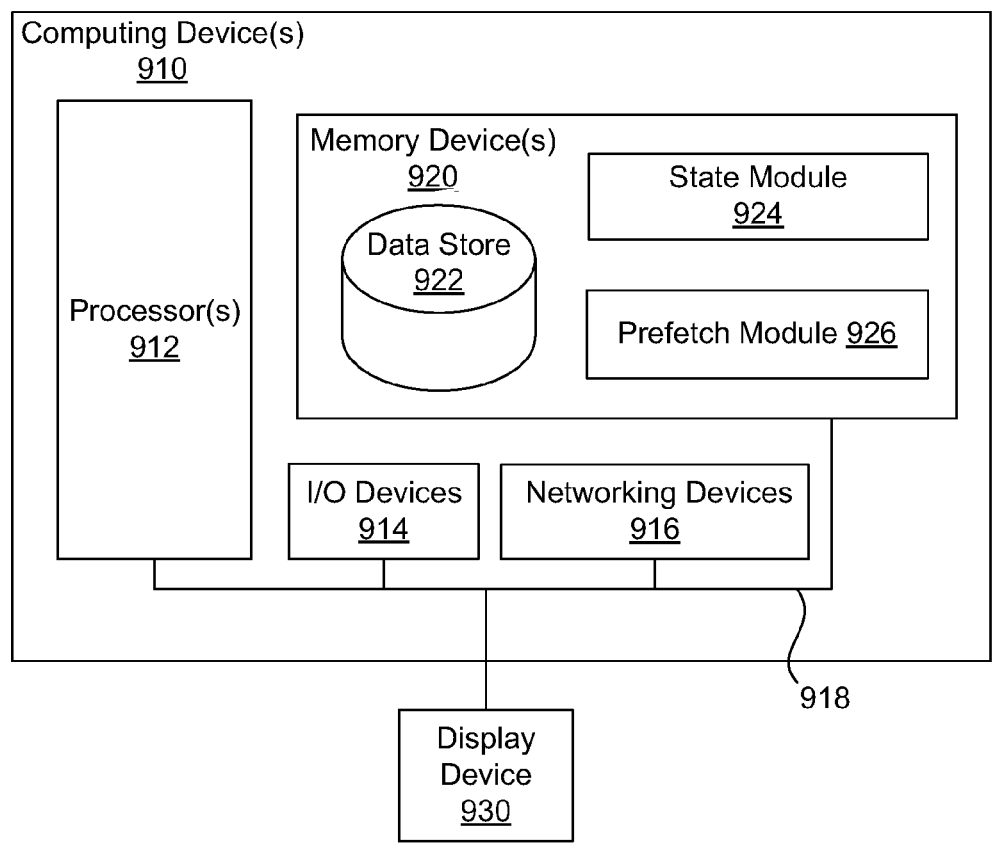
FIG. 9 is block diagram illustrating an example of a computing device for precomputing processes in accordance with an example of the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules that are executable by the processor(s) and data for the modules. Located in the memory device 920 are modules executable by the processor. For example, a state module 924 and a prefetch module 926, as well as other modules, may be located in the memory device 920. A data store 922 may also be located in the memory device 920 for storing data related to the modules and other applications along with an operating system that is executable by the processor(s) 912.

The computing system 910 of FIG. 9 may be utilized for computing processes, or in a more specific example, for completing an electronic commerce purchase. For example, the state module 924 may be used to save or retrieve a state of one or more processes within one or more APIs for use at a later time. The state module 924 may save the state of processes processed by the processor 912. The prefetch module 926 may enable prefetching of the processes which are part of the electronic commerce purchase API upon identification of one or more triggering events. Different processes in the API may be prefetched based on the triggering event, the availability of a saved state for other processes upon which a current process is predicated and so forth.

The computing device 910 may further include or be in communication with a display device 930. The display device 930 may be available for an administrator to use in interfacing with the computing device 910, such as to review operation of the system, modify rewards, make improvements to the system and so forth.

Various applications may be stored in the memory device 920 and may be executable by the processor(s) 912. Components or modules discussed in this description that may be implemented in the form of software using high programming level languages that are compiled, interpreted or executed using a hybrid of the methods.

The computing device 910 may also have access to I/O (input/output) devices 914 that are usable by the computing devices. An example of an I/O device 914 is a display screen that is available to display output from the computing devices. Other known I/O device may be used with the computing device as desired. Networking devices 916 and similar communication devices may be included in the computing device 910. The networking devices 916 may be wired or wireless networking devices 916 that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor 912. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for completing a purchase using a set of processes, comprising:
   receiving a request for a network page including an item for purchase from a client device;
   sending the network page to the client device;
   performing a subset of the set of processes in response to the request for the network page using a processor, where remainder processes outside of the subset are unperformed;
   saving a state of the subset of the set of processes; and
   performing the remainder processes using the processor, based on the state of the subset of the set of processes, when a purchase page is requested for the item.

2. The method of claim 1, wherein saving a state of the subset of the set of processes further comprises saving a state multiple times while performing the subset of the set of processes, the method further saving a state while performing the remainder processes.

3. The method of claim 1, further comprising tracking user interaction with the network page and initiating performance of the remainder processes when the user interaction indicates a likelihood that the purchase page will be requested.

4. The method of claim 1, wherein the set of processes includes a loading data process, a setting data process, an deriving data process, a validating data process and a finalizing data process.

5. The method of claim 4, wherein the subset of the set of processes includes the loading data process and the setting data process.

6. The method of claim 1, further comprising:
   prefetching some of the remainder processes when tracked user interaction indicates a likelihood that the purchase page will be requested; and
   finishing performing the remainder processes after the purchase page has been requested.

7. A system for precomputing processes associated with requests, comprising:
   a processor to process a subset of purchase processes in response to a page request;
   a state module to store a state of the subset of processes when the subset of processes have been processed by the processor; and
   a remainder module to perform a remainder of purchase processes, based on the state of the subset of purchase processes, when a purchase page is requested for an item for purchase.

8. The system of claim 7, further comprising a prefetch module configured to perform intermediary purchase processes in response to a likelihood greater than a predetermined threshold, based on user interaction with the page, that the purchase request will be received.

9. The system of claim 7, further comprising a history module for accessing a history of the subset of purchase processes as a basis for performing a current instance of the subset of purchase processes.

10. The system of claim 7, further comprising a shipping module to identify a shipping history of a user, the subset of purchase processes including processes for: identifying a shipping address; selecting a shipping method; and calculating a shipping cost.

11. The system of claim 7, further comprising a user data module to identify user data including a purchase payment method, the subset of purchase processes including processes for calculating a purchase sub-total, calculating a purchase tax, calculating a purchase total based on the sub-total and tax, and populating the purchase payment method based on the user data.

12. The system of claim 7, further comprising an expiration module to expire the state after a predetermined period of time.

13. The system of claim 12, further comprising a recalculation module to recalculate the state after the state has been expired.

14. The system of claim 7, further comprising a tracking module to track user interaction with the page.

15. The system of claim 14, further comprising an inventory management module to identify available inventory and reserve inventory for the purchase request in advance of the purchase request when the user interaction with the page indicates a likelihood greater than a predetermined threshold that the purchase request will be received.

16. A non-transitory computer readable medium having instructions embodied thereon, which, when executed by a processor, are operable to:
- load user data in response to a first request from a client device;
- set order data for purchase of an item based on the user data in response to the first request;
- derive item data to determine availability of the item for purchase in response to an indication that a second request will be received;
- validate the order data, including the item data, in response to the indication that the second request will be received; and
- finalize the order data to complete the purchase of the item in response to the second request.

* * * * *